US009337786B1

(12) United States Patent
Holmgren

(10) Patent No.: US 9,337,786 B1
(45) Date of Patent: May 10, 2016

(54) MULTI-LAYER DECOUPLING CAPACITOR FOR A TUBE AMPLIFIER ASSEMBLY

(71) Applicant: GENERAL ELECTRIC COMPANY, Schenectady, NY (US)

(72) Inventor: Bert Holmgren, Uppsala (SE)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 14/575,885

(22) Filed: Dec. 18, 2014

(51) Int. Cl.
*H01G 4/236* (2006.01)
*H03F 3/189* (2006.01)
*H03F 1/04* (2006.01)
*H01G 4/30* (2006.01)

(52) U.S. Cl.
CPC ............... *H03F 3/189* (2013.01); *H01G 4/30* (2013.01); *H03F 1/04* (2013.01); *H03F 2200/451* (2013.01)

(58) Field of Classification Search
CPC ....................................................... H01G 4/236
USPC ................. 330/67, 65, 307; 331/86; 315/502; 333/24 C; 361/306.3, 306.2
See application file for complete search history.

(56) References Cited

U.S. PATENT DOCUMENTS

| | | | |
|---|---|---|---|
| 2,551,715 A | 5/1951 | Young | |
| 3,784,911 A | 1/1974 | Ramstrom | |
| 6,333,537 B1 * | 12/2001 | Arita | ........................ H01L 28/75 257/310 |
| 6,417,634 B1 | 7/2002 | Bergstrom | |
| 7,184,256 B1 * | 2/2007 | Sato | ......................... H01G 4/35 361/302 |
| 7,339,366 B2 | 3/2008 | Li | |
| 7,569,452 B2 * | 8/2009 | Fu | .......................... H01G 4/232 257/E21.01 |
| 7,982,561 B2 | 7/2011 | Mendenhall | |
| 8,106,370 B2 | 1/2012 | Norling et al. | |
| 8,106,570 B2 | 1/2012 | Norling et al. | |
| 8,153,997 B2 | 4/2012 | Norling et al. | |
| 8,169,277 B2 | 5/2012 | McIntyre et al. | |
| 8,653,762 B2 | 2/2014 | Eriksson et al. | |

OTHER PUBLICATIONS

Whitaker, Jerry C., Power Vacuum Tubes Handbook 2nd Edition, Chapter 5, "Applying Vacuum Tube Devices" (2000).
Tube Amplification Unit (TAU) of General Electric MINITrace, Part No. 907630 (1999).
Kurkin, G.Y., "Other RF Power Sources," In Frontiers of Accelerator Technology (1999).
MINITrace Qilin: Installation Manual, Revision 13 (2014), pp. 1-16 and 217-223.
MINITrace Qilin: Service Manual, Revision 14 (2014), pp. 361-363 and 423-429.

* cited by examiner

*Primary Examiner* — Joseph Chang
(74) *Attorney, Agent, or Firm* — Dean D. Small; The Small Patent Law Group, LLC

(57) ABSTRACT

Tube amplifier assembly including a tube assembly having a support frame and a vacuum tube secured to the support frame. The support frame includes a ground wall that is electrically conductive and configured to be coupled to ground. The tube amplifier assembly also includes a supply cable electrically coupled to the vacuum tube. The tube amplifier assembly also includes a multi-layer decoupling capacitor having a first insulation layer, a power electrode, a second insulation layer, and a ground plate. The first insulation layer is interleaved between the ground wall and the power electrode, and the second insulation layer is interleaved between the power electrode and the ground plate. The supply cable is electrically coupled to the power electrode, and the ground plate is mounted to and electrically coupled to the ground wall of the support frame.

20 Claims, 9 Drawing Sheets

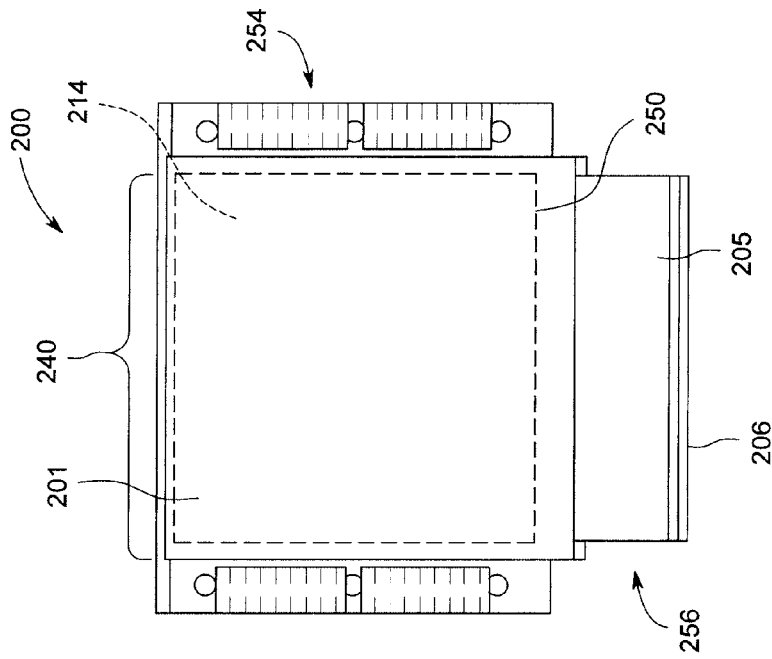
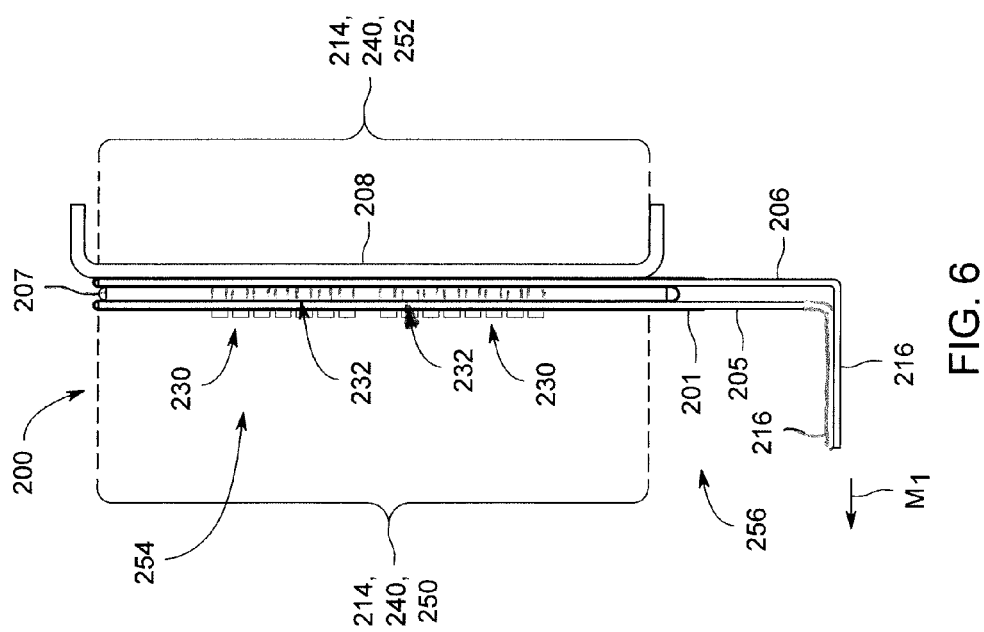
FIG. 7
FIG. 6

MULTI-LAYER DECOUPLING CAPACITOR FOR A TUBE AMPLIFIER ASSEMBLY

CROSS-REFERENCE TO RELATED APPLICATIONS

The subject matter set forth herein is similar to subject matter described in U.S. application Ser. Nos. 14/575,993; 14/575,914; and 14/575,958, which are filed on the same day as the present application. Each of the above applications is incorporated herein by reference in its entirety.

BACKGROUND

The subject matter herein relates generally to decoupling capacitors and, more specifically, to decoupling capacitors that may be used in high power systems, such as an RF system of an isotope production system.

Radioisotopes (also called radionuclides) have several applications in medical therapy, imaging, and research, as well as other applications that are not medically related. Systems that produce radioisotopes typically include a particle accelerator, such as a cyclotron, that accelerates a beam of charged particles (e.g., H⁻ ions) and directs the beam into a target material to generate the isotopes. The cyclotron includes a particle source that provides the particles to a central region of an acceleration chamber. The cyclotron uses electrical and magnetic fields to accelerate and guide the particles along a predetermined orbit within the acceleration chamber. The magnetic fields are provided by electromagnets and a magnet yoke that surrounds the acceleration chamber. The electrical fields are generated by a pair of radio frequency (RF) electrodes (or dees) that are located within the acceleration chamber. The RF electrodes are electrically coupled to an RF power generator that may include, for example, oscillators, amplifiers, control circuitry, and power supplies. The RF power generator energizes the RF electrodes to provide the electrical field. The electrical field combines with the magnetic field within the acceleration chamber and causes the particles to take a spiral-like orbit that has an increasing radius. When the particles reach an outer portion of the orbit, the particles are directed toward the target material for radioisotope production. In addition to controlling the orbit of the particles, the RF electrodes may be used to pull the particles from a particle source in the acceleration chamber.

To operate the RF electrodes within the acceleration chamber, a considerable amount of electric power (e.g., 5 kW to 2 MW) is generated by the RF power generator and delivered to the RF electrodes. The power generator includes, among other things, a tube amplifier unit having a power electron vacuum tube. The vacuum tube may be, for example, a power triode having a cathode, anode, and control grid. The cathode is heated by a filament that receives current from a power supply. The heated filament causes the cathode to emit electrons, which flow through the vacuum tube toward the anode. The control grid is positioned between the cathode and anode and may be used to control the flow of the electrons.

The current for heating the filament is transmitted through one or more cables (or flying leads) and is capable of carrying a substantial amount of electromagnetic interference (EMI) from the power tube. To reduce the EMI, the power supply may be decoupled to ground. At least some known RF power generators use a plurality of conventional ceramic capacitors to decouple the power supply to ground. Although the ceramic capacitors may be effective in decoupling the power supply, the ceramic capacitors have certain drawbacks. For example, the ceramic capacitors may be brittle and are consequently at risk of being damaged during assembly and/or maintenance of the RF power generator. For instance, when the vacuum tube is replaced, the ceramic capacitors are detached from cable terminals and then re-attached to cable terminals using hardware and tools that can damage the ceramic capacitors. In addition to the above, the ceramic capacitors may be expensive and bulky, and it is often necessary to combine several ceramic capacitors together. Using multiple ceramic capacitors can be costly and occupy a substantial amount of space.

BRIEF DESCRIPTION

In an embodiment, a tube amplifier assembly is provided that includes a tube assembly having a support frame and a vacuum tube secured to the support frame. The support frame includes a ground wall that is electrically conductive and configured to be coupled to ground. The tube amplifier assembly also includes a supply cable electrically coupled to the vacuum tube. The tube amplifier assembly also includes a multi-layer decoupling capacitor having a first insulation layer, a power electrode, a second insulation layer, and a ground plate. The first insulation layer is interleaved between the ground wall and the power electrode, and the second insulation layer is interleaved between the power electrode and the ground plate. The supply cable is electrically coupled to the power electrode, and the ground plate is mounted to and electrically coupled to the ground wall of the support frame. Optionally, the decoupling capacitor may include one or more power electrodes and ground plates.

In an embodiment, a multi-layer decoupling capacitor is provided that includes a power electrode having opposite first and second sides. The decoupling capacitor also includes first and second insulation layers configured to be positioned along the first and second sides, respectively, of the power electrode. The decoupling capacitor also includes a ground plate having opposite first and second sides. The ground plate is configured to be positioned along the second insulation layer such that second insulation layer is interleaved between the power electrode and ground plate. The ground plate includes conductive elements that project away from the first side of the ground plate in a mounting direction toward the first insulation layer. The conductive elements are configured to electrically couple to a support frame.

In an embodiment, a RF power generator is provided that includes a cabinet that defines a system cavity. The RF power generator also includes a tube amplifier assembly that is disposed within the system cavity. The tube amplifier assembly includes a support frame and a vacuum tube secured to the support frame. The support frame includes a grounding deck that is electrically conductive and engaged to an interior surface of the generator housing. The tube amplifier assembly also includes a supply cable electrically coupled to the vacuum tube. The RF power generator also includes a multi-layer decoupling capacitor having a first insulation layer, a power electrode, a second insulation layer, and a ground plate. The first insulation layer is interleaved between the support frame and the power electrode, and the second insulation layer is interleaved between the power electrode and the ground plate. The supply cable is electrically coupled to the power electrode and the ground plate is mounted to and electrically coupled to the support frame.

BRIEF DESCRIPTION OF THE DRAWINGS

FIG. 6 is a side view of the decoupling capacitor of FIG. 5.

FIG. 7 is a plan view of the decoupling capacitor of FIG. 5.

DETAILED DESCRIPTION

Figure 1:
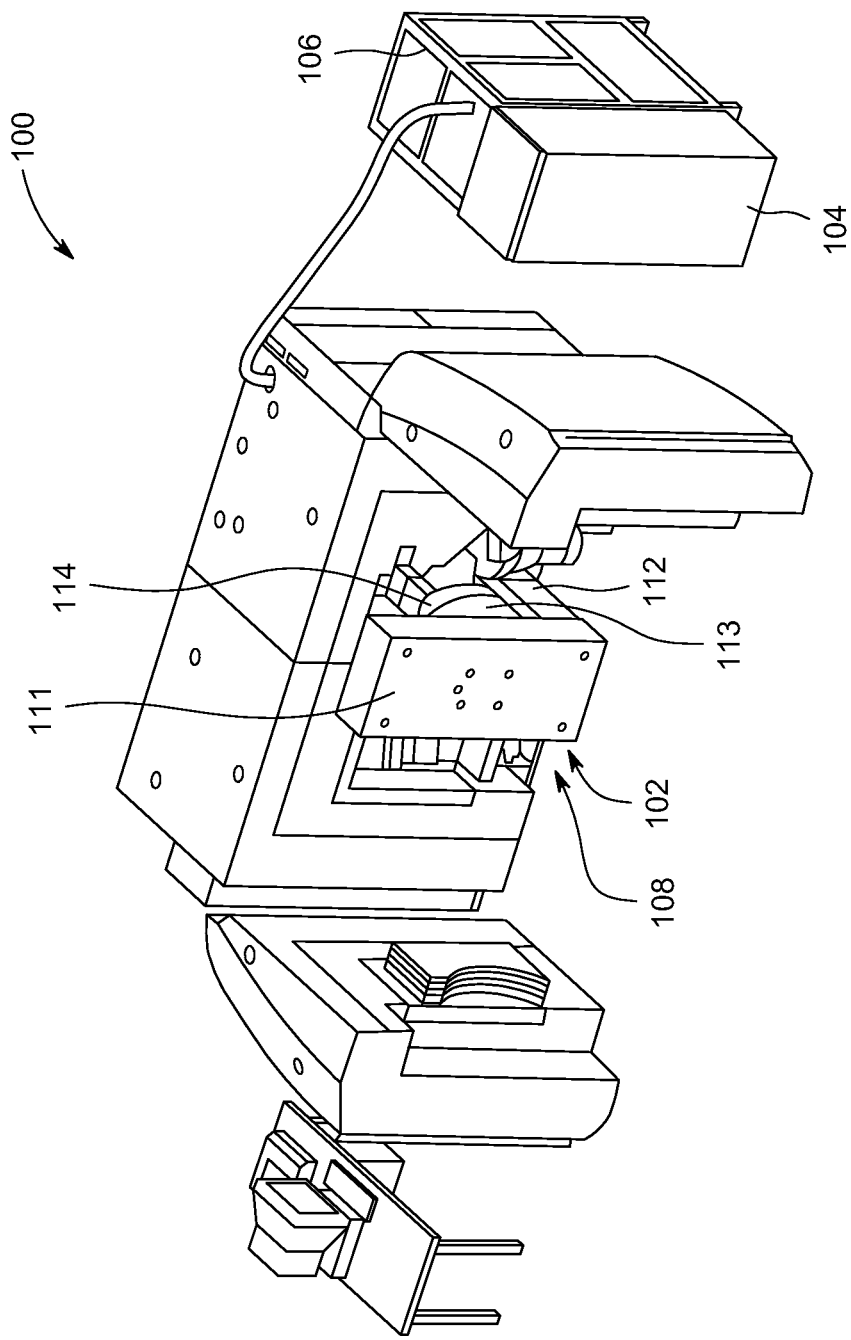
FIG. 1 is a perspective view of an isotope production system in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated, such as by stating "only a single" element or step. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Embodiments set forth herein include multi-layer decoupling capacitors and systems and sub-assemblies that include the decoupling capacitors. For example, the decoupling capacitors may be suitable for high power systems, such as isotope production systems, and particularly suitable for high power radio-frequency (RF) amplifiers used in the isotope production systems. The RF amplifiers may include power electron vacuum tubes, such as power triodes. In operation, the decoupling capacitors may function as local electrical energy reservoirs that counteract abrupt voltage changes and thereby reduce electromagnetic interference (EMI).

A technical effect provided by one or more embodiments may include a more rugged or sturdy decoupling capacitor that is capable of withstanding forces commonly experienced during operation, assembly, and/or maintenance of a high power system while also sufficiently decoupling a power supply to ground. Another technical effect may include a decoupling capacitor that is capable of supporting the weight of cables during operation of the high power system. Another technical effect may include a less expensive decoupling capacitor compared to the cost of several, conventional ceramic capacitors that must be combined to achieve a designated capacitance. Another technical effect may include using a reduced amount of space for the decoupling capacitors compared to the several ceramic capacitors. Another technical effect may include more simplified processes for assembling and/or maintaining a high power system. In particular embodiments, the high power system is a RF power generator that is capable of generating, for example, 1,000 W or more and 500 V or more. The current decoupled by the decoupling capacitors may be, for example, 50 A or more.

FIG. 1 is a perspective view of an isotope production system 100 in accordance with an embodiment. The isotope production system 100 includes a particle accelerator 102 that is operably coupled to a control cabinet 104 and a RF power generator 106. In the illustrated embodiment, the particle accelerator 102 is an isochronous cyclotron, but other types of particle accelerators may be used. As shown, the particle accelerator 102 includes a magnet assembly 108 that include yoke sections 111, 112 and electromagnets 113, 114 that are coupled to the yoke sections 111, 112, respectively.

Figure 2:
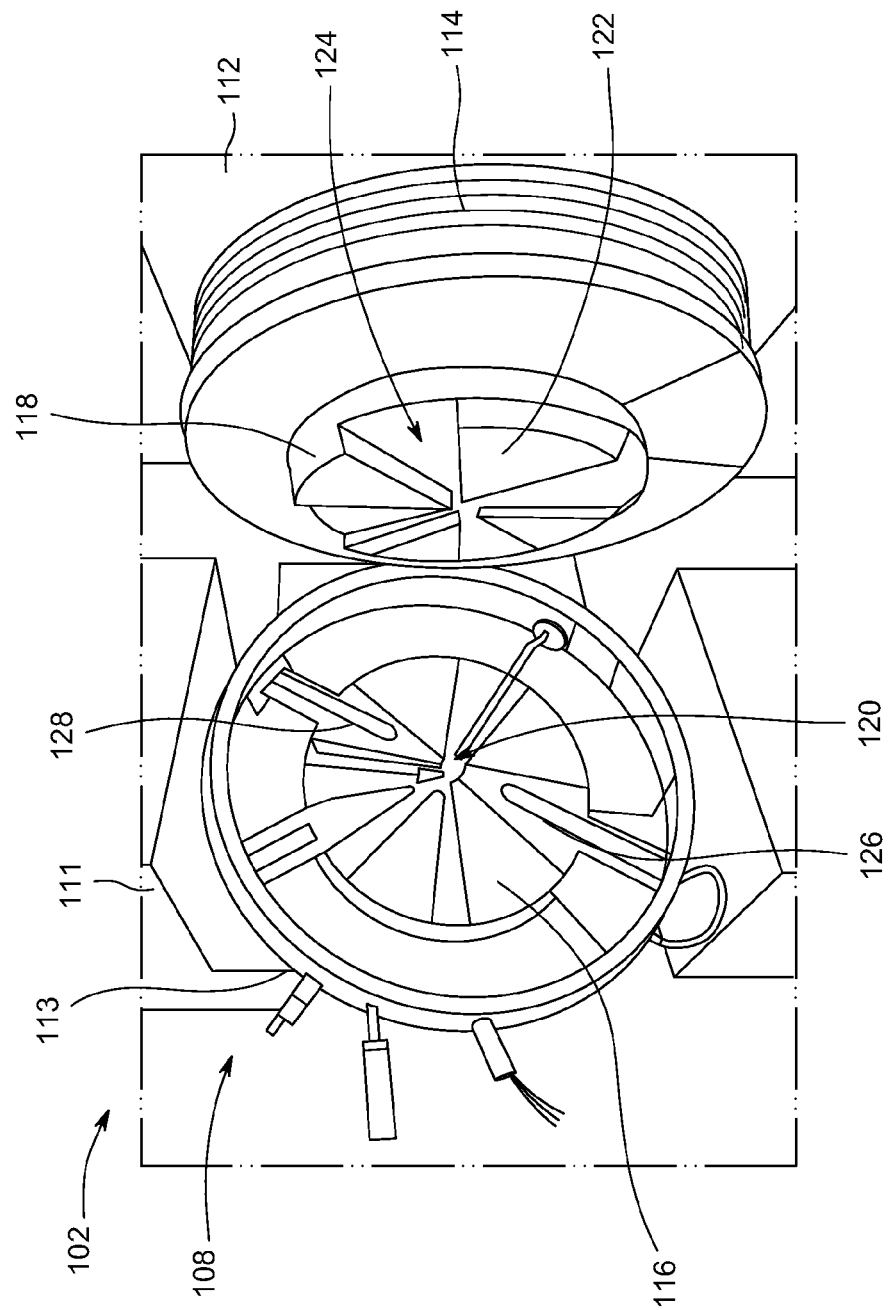
FIG. 2 illustrates a perspective view of the isotope production system of FIG. 1 having a cyclotron that is opened to illustrate components of the cyclotron.

FIG. 2 is a perspective view of a portion of the particle accelerator 102. Although the following description is with respect to the particle accelerator 102 being a cyclotron, it is understood that embodiments may include other particle accelerators and sub-systems of the same. As shown in FIG. 2, the particle accelerator 102 includes the magnet assembly 108 having the yoke sections 111, 112 and the electromagnets 113, 114. The electromagnets 113, 114 are magnet coils in the illustrated embodiment. The particle accelerator 102 may also include pole tops 116, 118. The pole top 116 is secured to the yoke section 111, and the pole top 118 is secured to the yoke section 112. As shown, the yoke section 112 is rotatably coupled to the yoke section 111. During operation, the yoke section 112 is in a closed position (as shown in FIG. 1) such that the pole tops 116, 118 oppose each other and an acceleration chamber is defined therebetween. When the particle accelerator 102 is not operating, the yoke section 112 may be opened to allow access to the acceleration chamber.

The acceleration chamber is configured to allow charged particles, such as $^1H^-$ ions, to be accelerated therein along a predetermined curved path that wraps in a spiral manner about an axis that extends between centers of the opposing pole tops 116, 118. The charged particles are initially positioned proximate to a central region 120 of the acceleration chamber. When the particle accelerator 102 is activated, the path of the charged particles may orbit around the axis that extends between the pole tops 116, 118. To this end, the pole top 118 includes hills 122 and valleys 124. The particle accelerator 102 also includes a pair of RF electrodes 126, 128 that are positioned adjacent to the pole top 116. The RF electrodes 126, 128 are sized and shaped to be received within corresponding valleys 124 of the pole tope 118 when the yoke section 112 is closed.

The RF electrodes 126, 128 are configured to be energized by the RF power generator 106 (FIG. 1) to generate an electrical field. The magnetic field is provided by the yoke sections 111, 112 and the electromagnets 113, 114. When the electromagnets 113, 114 are activated, a magnetic flux may flow between the pole tops 116, 118 and through the yoke sections 111, 112 around the acceleration chamber. When the electrical field is combined with the magnetic field, the particle accelerator 102 may direct the particles along the predetermined orbit. The RF electrodes 126, 128 cooperate with each other and form a resonant system that includes inductive and capacitive elements tuned to a predetermined frequency (e.g., 100 MHz). Accordingly, the RF electrodes 126, 128 are controlled by the RF power generator 106 to create an alternating electrical potential between the RF electrodes 126, 128 and thereby accelerate the charged particles.

In particular embodiments, the system 100 uses $^1$H technology and brings the charged particles (negative hydrogen ions) to a designated energy with a designated beam current. In such embodiments, the negative hydrogen ions are accelerated and guided through the particle accelerator 102. The negative hydrogen ions may then hit a stripping foil (not shown) such that a pair of electrons are removed and a positive ion, $^1$H$^+$ is formed. The positive ion may be directed into an extraction system (not shown). However, embodiments described herein may be applicable to other types of particle accelerators and cyclotrons. For example, in alternative embodiments, the charged particles may be positive ions, such as $^1$H$^+$, $^2$H$^+$, and $^3$He$^+$. In such alternative embodiments, the extraction system may include an electrostatic deflector that creates an electric field that guides the particle beam toward the target material.

The system 100 is configured to produce radioisotopes (also called radionuclides) that may be used in medical imaging, research, and therapy, but also for other applications that are not medically related, such as scientific research or analysis. When used for medical purposes, such as in Nuclear Medicine (NM) imaging or Positron Emission Tomography (PET) imaging, the radioisotopes may also be called tracers. By way of example, the system 100 may generate protons to make $^{18}$F$^-$ isotopes in liquid form, $^{11}$C isotopes as $CO_2$, and $^{13}$N isotopes as $NH_3$. The target material used to make these isotopes may be enriched $^{18}$O water, natural $^{14}N_2$ gas, $^{16}$O-water. In some embodiments, the system 100 may also generate protons or deuterons in order to produce $^{15}$O gases (oxygen, carbon dioxide, and carbon monoxide) and $^{15}$O labeled water.

The system 100 may also be configured to accelerate the charged particles to a predetermined energy level. For example, some embodiments described herein accelerate the charged particles to an energy of approximately 18 MeV or less. In other embodiments, the system 100 accelerates the charged particles to an energy of approximately 16.5 MeV or less. In particular embodiments, the system 100 accelerates the charged particles to an energy of approximately 9.6 MeV or less. In more particular embodiments, the system 100 accelerates the charged particles to an energy of approximately 7.8 MeV or less. However, embodiments describe herein may also have an energy above 18 MeV. For example, embodiments may have an energy above 100 MeV, 500 MeV or more. Likewise, embodiments may utilize various beam current values. By way of example, the beam current may be between about of approximately 10-30 µA. In other embodiments, the beam current may be above 30 µA, above 50 µA, or above 70 µA. Yet in other embodiments, the beam current may be above 100 µA, above 150 µA, or above 200 µA.

Figure 3:
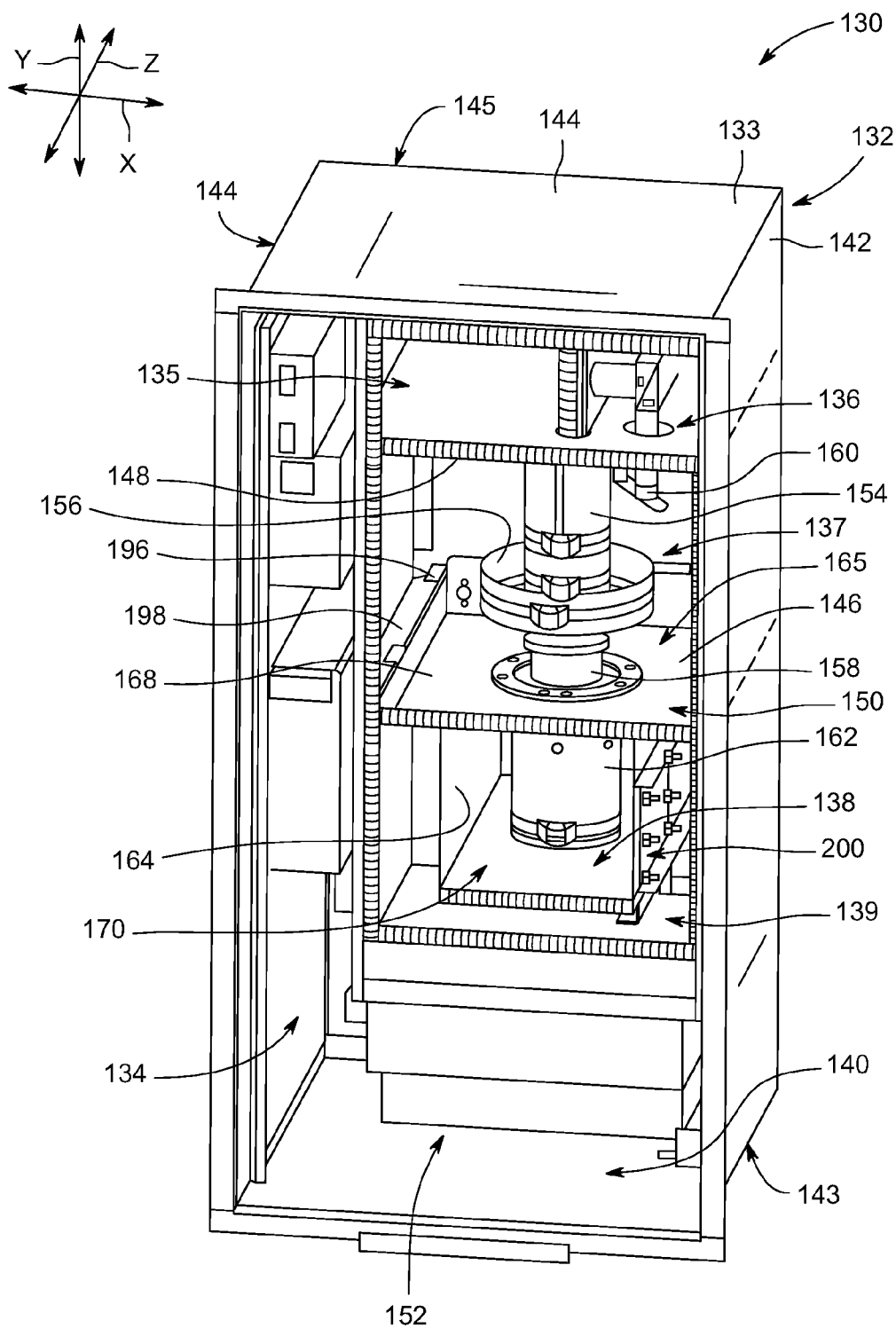
FIG. 3 is a perspective view of a radio frequency (RF) power generator having a tube amplifier assembly in accordance with an embodiment.

FIG. 3 is a perspective view of a RF power generator 130, which may be used with an isotope production system, such as the isotope production system 100 (FIG. 1). The RF power generator 130 may be similar to the RF power generator 106 (FIG. 1) and configured to energize RF electrodes, such as the RF electrodes 126, 128 (FIG. 2). The RF power generator 130 includes a generator housing 132, which may be referred to as a cabinet in some embodiments The generator housing 132 encloses a number of interconnected components of the RF power generator 130 that cooperate in generating a sufficient amount of electric power for operating the RF electrodes.

The generator housing 132 defines a system cavity 134 that may be apportioned to form compartments 135-140. The generator housing 132 may include an outer enclosure 133 having external walls 141-145. In some embodiments, the external walls 141-145 face an exterior space that is readily accessible to individuals and/or that has equipment positioned adjacent to one or more of the external walls 141-145. As such, the generator housing 132 and other internal shielding structures may be configured to obtain a designated electromagnetic compliance (EMC). More specifically, the generator housing 132 may be configured to reduce leakage of electromagnetic energy into the exterior space. Although not shown, the generator housing 132 may also have an housing door that provides general access to the system cavity 134 and an optional access panel that is configured to seal the compartments 135-139. As shown, the RF power generator 130 is oriented with respect to mutually perpendicular x-, y-, and z-axes. The x-axis may be a lateral axis and extends laterally between the external walls 142, 144. The y-axis may represent a vertical axis that extend parallel to the force of gravity, and the z-axis may extend into the system cavity 134.

The compartment 137 may be hereinafter referred to as an anode cavity 137, and the compartment 138 may be hereinafter referred to as a cathode cavity 138. The compartments 135-140 may be defined by interior walls positioned within the system cavity 134. For example, the interior walls include a grounding deck 146 and a shorting deck 148. The grounding deck 146 separates the anode and cathode cavities 137, 138. One or more of the interior walls may include apertures 150 that permit air to flow therethrough. For example, the RF power generator 130 may include a thermal control unit 152 (e.g., air cooling unit) that circulates air within the system cavity 134.

Operative components of the RF power generator 130 that are disposed within the anode cavity 137 may include an anode resonator inner conductor 154, an annular capacitor 156, and a vacuum tube 158. The anode cavity 137 may also include an anode output coupling loop 160 therein. The cathode cavity 138 may be at least partially defined by a shielding structure 164 and include a cathode resonator inner conductor 162 therein. In the illustrated embodiment, the shielding structure 164 is U-shaped and secured to the grounding deck 146. The grounding deck 146 and the shielding structure may collectively form a support frame 168. As shown, the RF power generator 130 also includes multi-layered decoupling capacitors 200 that are secured to the shielding structure 164.

Figure 9:
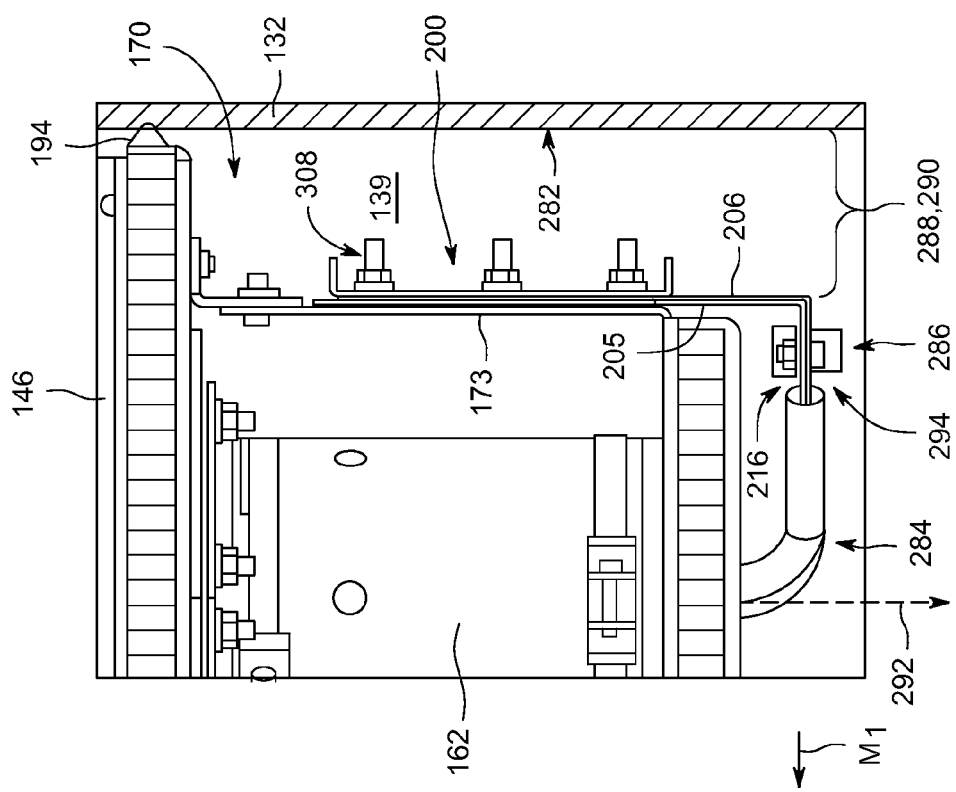
FIG. 9 is a front end view of the tube amplifier assembly having the decoupling capacitor of FIG. 5 mounted thereto.

In some embodiments, the support frame 168, the vacuum tube 158, and/or the annular capacitor 156 may be combined to form a tube assembly 165. As described below, the tube assembly 165 may be secured to the decoupling capacitors 200 and a supply cable 284 (shown in FIG. 9) to form a tube amplifier assembly 170. The tube amplifier assembly 170 may be configured to be removed as a unit. In an exemplary embodiment, the tube amplifier assembly 170 includes the support frame 168, the vacuum tube 158, the annular capacitor 156, and the decoupling capacitors 200. In other embodiments, the tube amplifier assembly 170 may include fewer or more components that are removable as a unit. For instance, the tube amplifier assembly 170 may include the tube assembly 165, one or more of the decoupling capacitors 200, and the supply cable 284 (FIG. 9).

In an exemplary embodiment, the vacuum tube 158 is a power triode that includes a cathode, anode, and control grid (not shown). The cathode may be heated by a filament that receives current from a power supply (not shown). The heated filament causes the cathode to emit electrons, which flow through the vacuum tube 158 toward the anode. The control grid is positioned between the cathode and anode and may be used to control the flow of the electrons. As set forth herein, the decoupling capacitors 200 are configured to decouple the power supply that heats the filaments to ground. It should be understood, however, that the decoupling capacitors 200 may be used with other types vacuum tubes and in other types of high power systems.

Figure 4:
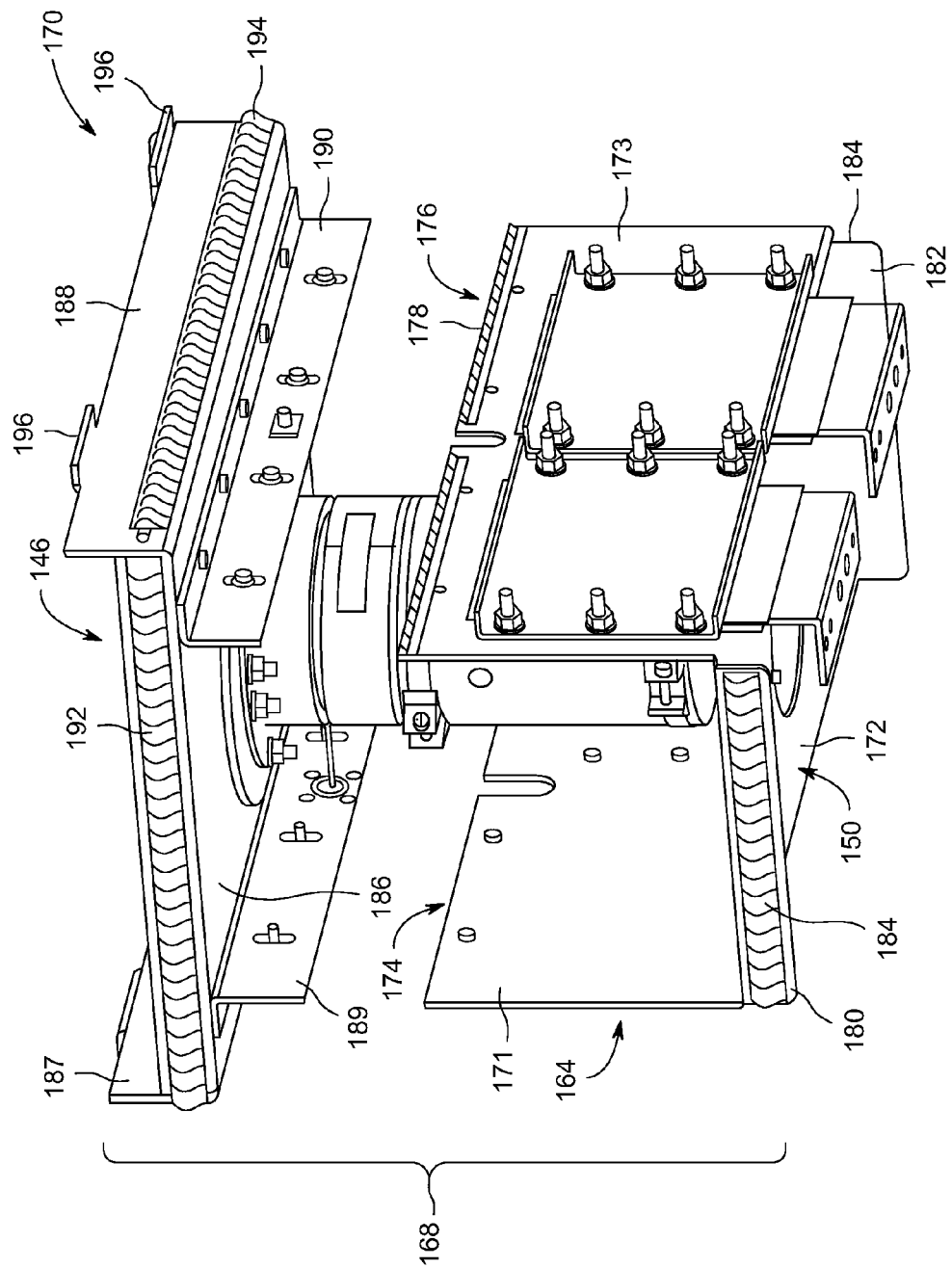
FIG. 4 is a partially exploded view of a portion of the tube amplifier assembly.

FIG. 4 is a partially exploded view of a portion of the tube amplifier assembly 170. As shown, the grounding deck 146 and the shielding structure 164 of the support frame 168 have been separated. The shielding structure 164 may include a plurality of ground walls 171-173. In the illustrated embodiment, the ground walls 171-173 form a U-shaped structure, but other shapes may be formed by the ground walls 171-173. The ground wall 172 extends between and joins the ground walls 171, 173 and includes a plurality of the apertures 150 for airflow. The ground walls 171, 173 may include coupling edges 174, 176, respectively, that are configured to electrically couple to the grounding deck 146. For example, the ground walls 171, 173 may include spring fingers 178 along the coupling edges 174, 176.

Also shown in FIG. 4, the shielding structure 164 may include a front grounding panel 180 and a rear grounding panel 182 that each include a plurality of contact springs 184. The contact springs 184 along the front ground panel 180 may be configured to engage the access panel (not shown), and the contact springs 184 along the rear ground panel 182 may be configured to engage an interior surface of the generator housing 132 (FIG. 3).

The grounding deck 146 includes a base plate 186, a pair of sidewalls 187, 188, and a pair of structure supports 189, 190. The base plate 186 includes contact springs 192 positioned along a front end that are configured to engage the access panel (not shown). Although not shown, the base plate 186 may also include contact springs along a back end that are configured to engage an interior surface of the generator housing 132. Likewise, the sidewall 188 may include contact springs 194 positioned therealong that are configured to engage an interior surface of the generator housing 132. Although not shown, the sidewall 187 may also include contact springs positioned therealong for engaging another interior surface of the generator housing 132.

The structure supports 189, 190 are secured to the base plate 186 and are configured to couple to the ground walls 171, 173, respectively. The spring fingers 178 may engage the ground walls 171, 173. Accordingly, the support frame 168 may provide conductive paths that extend from the ground walls 171, 173 to one or more of the contact springs 184, 192, and 194 and, consequently, to the generator housing 132. As such, the ground walls 171, 173 may be configured to electrically ground the decoupling capacitors 200.

Also shown in FIG. 4, the support frame 168 may include blocking tabs 196 that are configured to engage the generator housing 132. Returning briefly to FIG. 3, the blocking tabs 196 may be configured to engage ledge supports or surfaces 198 of the generator housing 132 as the support frame 168 is lowered into position. More specifically, the blocking tabs 196 may be configured to prevent the support frame 168 from moving completely through the opening between the ledge supports 198. The positioning of the support frame 168 as part of a movable tray assembly is described in greater detail in U.S. patent application Ser. No. 14/575,993, which is incorporated herein by reference in its entirety.

Figure 5:
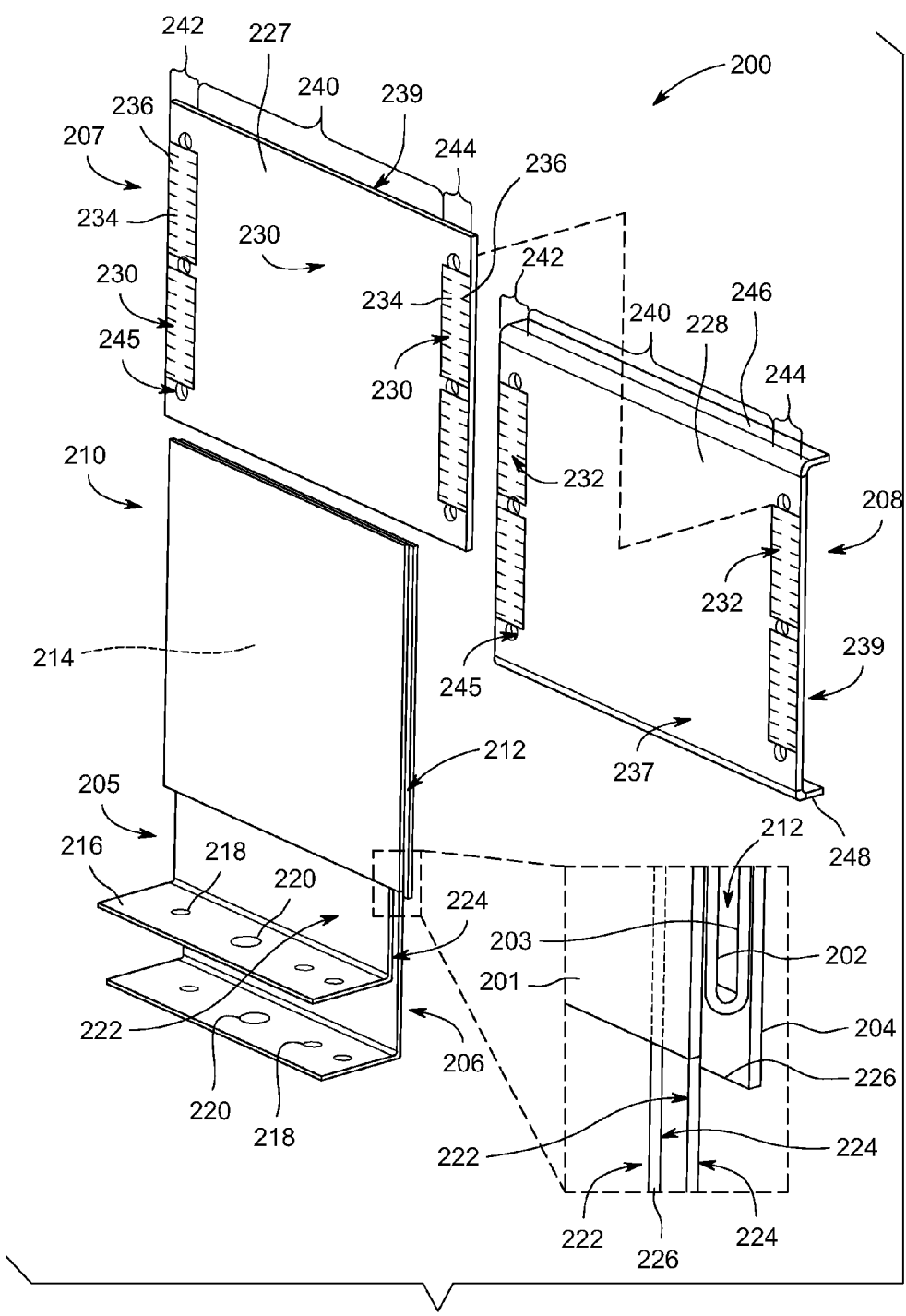
FIG. 5 is a partially exploded view of a multi-layer decoupling capacitor that may be used by the RF power generator of FIG. 3.

FIG. 5 is an exploded view of an exemplary decoupling capacitor 200. The decoupling capacitor 200 is configured to have multiple layers stacked side-by-side. For example, the decoupling capacitor 200 includes a plurality of insulation layers 201-204 (shown in the enlarged view of FIG. 5), a plurality of power electrodes 205, 206, and a plurality of ground plates, 207-208. When assembled, the different layers are ordered (from left-to-right in FIG. 5) the insulation layer 201, the power electrode 205, the insulation layer 202, the ground plate 207, the insulation layer 203, the power electrode 206, the insulation layer 204, and the ground plate 208. The assembled decoupling capacitor 200 is shown in FIGS. 7-10. However, it should be understood that the decoupling capacitor 200 may have a different number of layers and/or a different combination of layers in other embodiments. For example, in some embodiments, the decoupling capacitor 200 may include the insulation layers 201, 202, only one of the power electrodes 205, 206, and only one of the ground plates 207, 208.

Various materials may be used for the different layers. For example, one or more of the power electrodes 205, 206 and the ground plates 207, 208 may be aluminum or other suitably conductive material. One or more of the insulation layers 201-204 may be polyimide film (e.g., Kapton®) or other insulative or dielectric material. In some embodiments, two or more of the insulation layers 201-204 are portions of a single continuous sheet of insulative material. For example, in the illustrated embodiment, each of the insulation layers 201-204 is part of an insulative sheet 210. The insulative sheet 210 is configured to be wrapped around edges of different layers of the power electrodes 205, 206 and the ground plate 207 to be interleaved between adjacent layers. As shown in FIG. 5, the insulative sheet 210 is wrapped around the power electrode 205 and wrapped around the power electrode 206. The insulative sheet 210 forms a plate-receiving slot 212 between the insulation layers 202, 203. The plate-receiving slot 212 is configured to receive the ground plate 207. In other embodiments, however, one or more of the insulation layers 201-204 may be discrete layers. For example, each of the insulation layers 201-204 may be a separate layer that does not form into other insulation layers.

Figure 10:
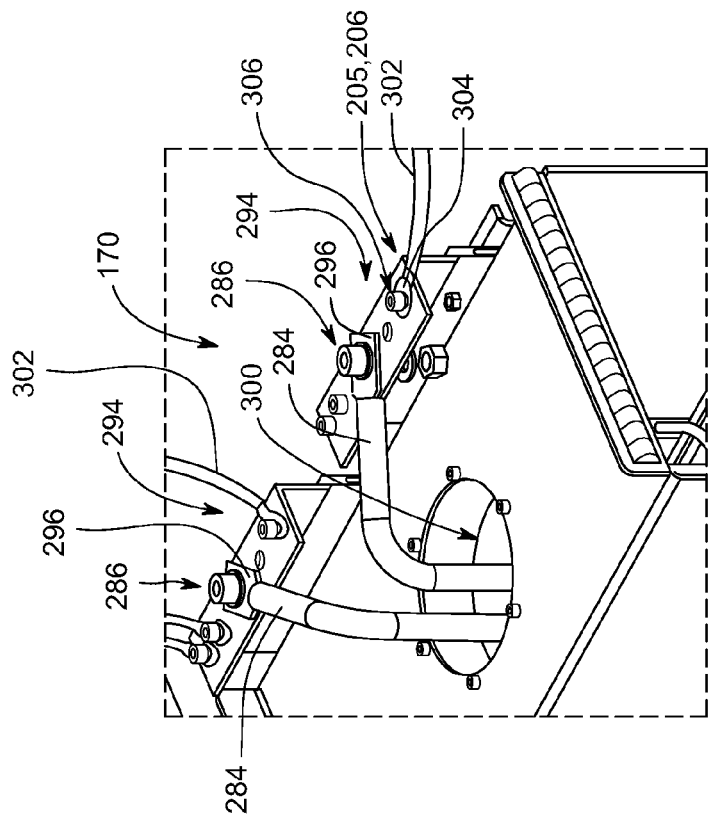
FIG. 10 is a perspective view of an underside of the tube amplifier assembly having the decoupling capacitor of FIG. 5 mounted thereto.

The power electrodes 205, 206 are configured to be electrically coupled to the supply cable 284 (FIG. 9). Each of the power electrodes 205, 206 may include a capacitive section 214 that is configured to overlap with other sections of the insulation layers 201-204 and the ground plates 207, 208 and a coupling section 216 that is configured to directly couple to the supply cable 284. The coupling section 216 may also be configured to couple to external cables 302 (FIG. 10). For example, each of the coupling sections 216 includes openings 218, 220. The openings 218 may be configured to receive hardware 306 (shown in FIG. 10) for securing the corresponding coupling section 216 to the external cable 302. The openings 220 may be configured to receive hardware 286 (shown in FIG. 9) for securing the corresponding coupling section 216 to the supply cable 284 (FIG. 9).

Each of the power electrodes 205, 206 may include a first side (or inner side) 222 and an opposite second side (or outer side) 224. The first side 222 may include a portion that overlaps with the other layers of the decoupling capacitor 200 and generally faces the ground wall 173 or the support frame. The second side 224 may generally face away from the ground wall 173 or the support frame 168. Each of the power electrodes 205, 206 may also include a panel edge 226 (shown in the enlarged view of FIG. 5) that extends between the first and second sides 222, 224. The power electrodes 205, 206 in FIG. 5 have a substantially uniform thickness between the first and second sides 222, 224, but it is contemplated that the thicknesses may vary in other embodiments.

In some embodiments, the power electrodes 205, 206 are configured to be secured to each other. Optionally, the power electrodes 205, 206 may be shaped such that the second side 224 along the coupling section 216 of the power electrode 205 directly interfaces with the first side 222 along the coupling section 216 of the power electrode 206. The power electrodes 205, 206 may be secured to each other along the interface. In such embodiments, the decoupling capacitor 200 may close a separation gap 280 (shown in FIG. 8) that extends between the power electrodes 205, 206.

The capacitive and coupling sections 214, 216 for each of the power electrodes 205, 206 may extend along respective planes that are non-parallel relative to each other. In the illustrated embodiment, the power electrodes 205, 206 are bracket- or L-shaped such that the capacitive and coupling sections 214, 216 of the corresponding power electrode extend along planes that are substantially perpendicular to each other. However, in other embodiments the capacitive and coupling sections 214, 216 of a corresponding power electrode may extend along planes that form a non-orthogonal angle with respect to each other, such as 45°, 80°, 110°, and the like. In the illustrated embodiment, the coupling sections 216 of the power electrodes 205, 206 are planar. In other embodiments, the coupling sections 216 may have non-planar shapes. For example, the coupling section 216 of the power electrode 205 and/or the power electrode 206 may be shaped to include steps or stairs.

The ground plates 207, 208 include plate bodies 227, 228, respectively, and conductive elements 230, 232, respectively. Each of the plate bodies 227, 228 includes a first side (or inner side) 237 and a second side (or outer side) 239. The conductive elements 230, 232 are configured to extend from the respective plate bodies 227, 228 to electrically couple the respective plate bodies 227, 228 to the ground wall 173 (FIG. 4). More specifically, the conductive elements 230 may project from the first side 237 of the plate body 227 and engage the ground wall 173. The conductive elements 232 may project from the first side 237 of the plate body 228 and engage the plate body 227. In an exemplary embodiment, each of the conductive elements 230, 232 include a spring base 234 that is secured to the corresponding plate body and a plurality of spring bodies 236 (e.g., fingers) that couple to the spring base 234. The spring bodies 236 are shaped to project away from the corresponding spring base 234 and the corresponding plate body. The spring bodies 236 may be capable of flexing.

In addition to the conductive elements 230, 232, the decoupling capacitor 200 may include fasteners 308 (shown in FIG. 9), such as nuts, bolts, and washers, that function as conductive elements and electrically couple the plate body 228 to the ground wall 173. However, it should be understood that other mechanisms of electrically coupling the plate bodies 227, 228 to the ground wall 173 may be employed in other embodiments. The various conductive elements may provide low impedance ground paths between the ground plates 207, 208 and the ground wall 173 (FIG. 4).

The plate bodies 227, 228 are sized and shaped to directly overlap portions of the power electrodes 205, 206. More specifically, each of the plate bodies 227, 228 may include an overlapping section 240 that directly overlaps one or more adjacent capacitive sections 214 of the power electrodes 205, 206. For example, the overlapping section 240 of the plate body 227 is configured to overlap the capacitive section 214 of the power electrode 205 and overlap the capacitive section 214 of the power electrode 206. The overlapping section 240 of the plate body 228 is configured to overlap the capacitive section 214 of the power electrode 206.

In some embodiments, the plate bodies are 227, 228 include portions that do not directly overlap with the power electrodes 205, 206, but permit the plate bodies 227, 228 to be physically mounted to the ground wall 173 and/or permit the plate bodies 227, 228 to be electrically coupled to the ground wall 173. For example, each of the plate bodies 227, 228 includes mounting sections 242, 244. In the illustrated embodiment, the mounting sections 242, 244 are extensions of the plate bodies 227, 228 located on opposite ends of the corresponding overlapping section 240. However, in other embodiments, the mounting sections 242, 244 may be interior sections that align with openings in the power electrodes and/or insulation layers. The mounting sections 242, 244 of the plate body 227 are coupled to the conductive elements 230, and the mounting sections 242, 244 of the plate body 228 are coupled to the conductive elements 232. The mounting sections 242, 244 may include openings or holes 245 that are configured to receive corresponding hardware for mounting the decoupling capacitor 200 to the ground wall 173.

In the illustrated embodiment, the layers 201-207 are configured to be compressed between the ground wall 173 and the ground plate 208. The plate body 228 may be configured to assure that voids or air gaps between the ground wall 173 and different layers 201-208 do not form during assembly or lifetime operation. For example, as shown, the plate body 228 may include flanges or ledges 246, 248 located on opposite sides of the corresponding overlapping section 240. The flanges 246, 248 may provide structurally integrity to the plate body 228 such that the plate body 228 does not bend or warp during assembly or during lifetime operation. As such, the ground plate 208 may reduce the likelihood that voids or air gaps form between the ground wall 173 and different layers 201-208.

FIGS. 6 and 7 illustrate a side view and a plan view, respectively, of the fully assembled decoupling capacitor 200. For perspective, the closest layer in FIG. 7 is the insulation layer 201. When fully assembled, the capacitive section 214 of the power electrode 205 overlaps with the overlapping section 240 of the ground plate 207 at an overlapping area 250 (indicated by a square-shaped dashed box in FIG. 7), and the capacitive section 214 of the power electrode 206 overlaps with the overlapping section 240 of the ground plate 208 at an overlapping area 252 (shown in FIG. 6). The overlapping areas 250, 252 are substantially identical in the illustrated embodiment, but may have different shapes or sizes in other embodiments.

Dimensions and profiles of the plate bodies 227, 228 and/or the capacitive sections 214 may be configured to obtain a designated electrical performance. More specifically, the dimensions and profiles of the plate bodies 227, 228 and/or the capacitive sections 214 may be configured to obtain a designated capacitance. For example, either of the overlapping areas 250, 252 may be at least 10 centimeters $(cm)^2$. In some embodiments, either of the overlapping areas 250, 252 may be at least 25 $cm^2$ or at least 50 $cm^2$. In some embodiments, either of the overlapping areas 250, 252 may be at least 5 $cm^2$ or at least 10 $cm^2$. In particular embodiments, either of the overlapping areas 250, 252 may be at least 25 $cm^2$, 50 $cm^2$, 75 $cm^2$, or at least 100 $cm^2$. In more particular embodiments, either of the overlapping areas 250, 252 may be at least 125 $cm^2$, at least 150 $cm^2$, or more. However, the overlapping areas 250, 252 may be smaller or larger in other embodiments. Moreover, alternative embodiments may include only one overlapping area or more than two overlapping areas.

In the illustrated embodiment, the plate bodies 227, 228 of the ground plates 208, 208 and the capacitive sections 214 of the power electrodes 205, 206 have substantially rectangular profiles. However, the profiles of the plate bodies 227, 228 and/or the capacitive sections 214 may have different shapes in other embodiments. Non-limiting examples of shapes of the profiles include a circle, semi-circle, triangle, pentagon, hexagon, other polygon, or combination of the above. Moreover, although the capacitive sections 214 and overlapping sections 240 are planar in the illustrated embodiment, it is contemplated that alternative embodiments may include capacitive sections and overlapping sections that are not planar.

When fully assembled, the decoupling capacitor 200 may include a mounted portion 254 and an overhang portion 256. The mounted portion 254 may be configured to directly overlap with the ground wall 173. The mounted portion 254 includes the conductive elements 230 projecting from the first side 222 of the ground plate 207. The overhang portion 256 may be configured to clear the ground wall 173. For example, the overhang portion 256 may be shaped to extend to a space where the supply cables 284 (FIG. 9) and the external cables 302 (FIG. 10) are capable of securing to the coupling sections 216 of the power electrodes 205, 206. As shown in FIG. 6, each of the coupling sections 216 and the conductive elements 230, 232 extend in a common mounting direction $M_1$.

Figure 8:
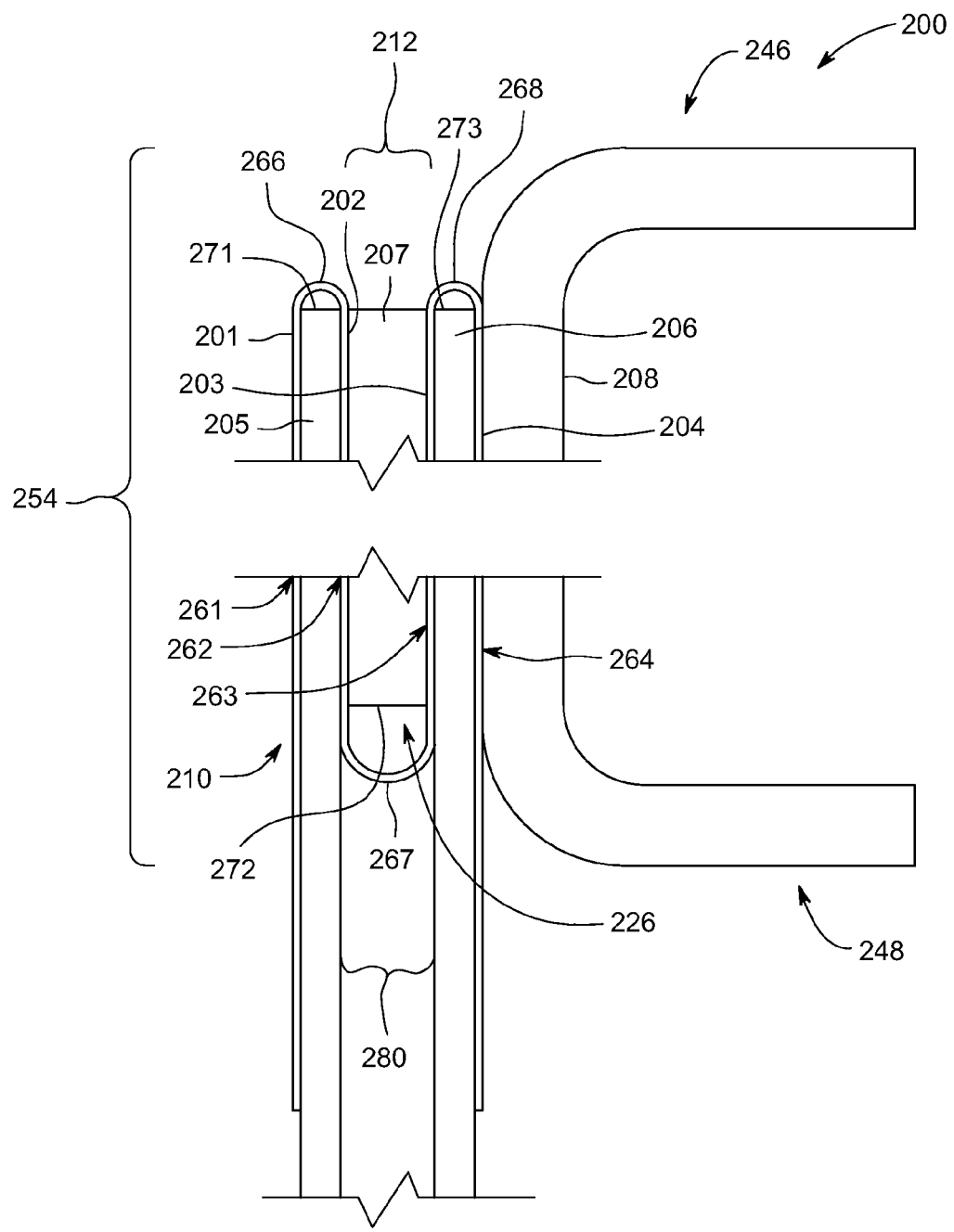
FIG. 8 is an enlarged side view of the decoupling capacitor of FIG. 5.

FIG. 8 is an enlarged side view of the decoupling capacitor 200 that includes a portion of the decoupling capacitor 200 proximate to the flange 246 and a portion of the decoupling capacitor 200 proximate to the flange 248. More specifically, FIG. 8 shows (from left-to-right) the insulation layer 201, the power electrode 205, the insulation layer 202, the ground plate 207, the insulation layer 203, the power electrode 206, the insulation layer 204, and the ground plate 208. In the illustrated embodiment, each of the layers 201-208 extend parallel to one another throughout the mounted portion 254.

When assembled and mounted to the ground wall 173 (FIG. 4), the decoupling capacitor 200 forms a plurality of capacitive interfaces 261-264. In the illustrated embodiment, the decoupling capacitor 200 include four capacitive interfaces, but may include fewer or more in other embodiment. The insulation layers 201-204 are positioned along the capacitive interfaces 261-264, respectively. More specifically, the insulation layer 201 is configured to be interleaved between the ground wall 173 (FIG. 4) and the power electrode 205 along the capacitive interface 261. The insulation layer 202 is configured to be interleaved between the power electrode 205 and the ground plate 207 along the capacitive interface 262. The insulation layer 203 is configured to be interleaved between the ground plate 207 and the power electrode 206 along the capacitive interface 263, and the insulation layer 204 is configured to be interleaved between the power electrode 206 and the ground plate 208 along the capacitive interface 264. Like the overlapping areas 250, 252 (FIG. 6), a thickness of the insulation layers 201-204 may be configured to obtain a designated electrical performance. For example, the overlapping areas 250, 252 and the thicknesses of the insulation layers 201-204 may be configured to achieve a designated capacitance with high self resonance frequency compared to the fundamental frequency of the amplifier (e.g., about 100 MHz).

The insulation layers 202 and 203 define the plate-receiving slot 212 therebetween that is configured to receive the ground plate 207. Also shown in FIG. 8, the insulative sheet 210 includes sheet folds 266-268 that wrap around corresponding panel edges 226. More specifically, the sheet fold 266 joins the insulation layers 201, 202 and wraps around an edge portion 271 of the power electrode 205. The sheet fold 267 joins the insulation layers 202, 203 and wraps around an edge portion 272 of the ground plate 207, and the sheet fold 268 joins the insulation layers 203, 204 and wraps around an edge portion 273 of the power electrode 206.

The ground plate 207 and the insulation layers 202, 203 generate a separation gap 280 between the second side 224 of the power electrode 205 and the first side 222 of the power electrode 206. As described above, the coupling sections 216 (FIG. 5) of the power electrodes 205, 206 may be non-planar with respect to the capacitive sections 214. As such, when the power electrodes 205, 206 are arranged parallel to each other as shown in FIG. 8, the coupling sections 214 may be stacked side-by-side and secured directly to each other.

FIG. 9 is a side view of a portion of the tube amplifier assembly 170 illustrating the tube amplifier assembly 170 fully assembled and in operation. As shown, the contact springs 194 of the grounding deck 146 are engaged to an interior surface 282 of the generator housing 132. One of the decoupling capacitors 200 is shown and is mounted to the ground wall 173. A supply cable 284 is operably coupled to the vacuum tube 158 (FIG. 4) and secured to the coupling sections 216 of the power electrodes 205, 206 using hardware 286 (e.g., nuts, bolts, washers, and the like). The supply cable 284 may also be referred to as a flying lead. In the illustrated embodiment, a pair of supply cables 284 (e.g., input and output) are electrically coupled to the filament (not shown) within the vacuum tube 158.

In some embodiments, the decoupling capacitors 200 may have a substantially low or planar profile. For example, a confined space 288 of the compartment 139 exists between the ground wall 173 and the interior surface 282 of the generator housing 132. A separation gap 290 extending between the ground wall 173 and the interior surface 282 may be, for example, about 5 cm. Despite the confined space 288, multiple decoupling capacitors 200 may be positioned therein and mounted to the ground wall 173.

Also shown, the cathode resonator inner conductor 162 is aligned along a central axis 292 of the vacuum tube 158 (FIG. 4). In the illustrated embodiment, the central axis 292 extend generally parallel to a gravitational force direction. In some embodiments, the ground wall 173 and/or the decoupling capacitors 200 may be oriented to extend parallel to the central axis 292 of the vacuum tube 158 as shown in FIG. 9. Also shown, the coupling sections 216 extend in the mounting direction $M_1$ toward the central axis 292 such that the coupling sections 216 extend closer to the vacuum tube 158. As such, the cables 284 may extend less of a distance to reach the coupling sections 216. The coupling sections 216 may also form a platform 294 that is oriented perpendicular to the central axis 292. The platform 294 is configured to support the weight of the corresponding cable 284.

FIG. 10 is a perspective view of an underside of the tube amplifier assembly 170. Each of the supply cables 284 extends from a cavity 300 of the cathode resonator inner conductor 162 (FIG. 4) and couples to the corresponding platform 294 formed by the power electrodes 205, 206. Each of the supply cables 284 includes a cable terminal (or cable shoe) 296 that is secured to the corresponding coupling sections 216 using the hardware 286. Also shown, each of the platforms 294 may support an external cable 302. For example, each of the platforms 294 may mechanically and electrically couple to three external cables 302. The external cables 302 include corresponding cable terminals 304 that are secured to the platforms 294 using hardware 306.

Figure 11:
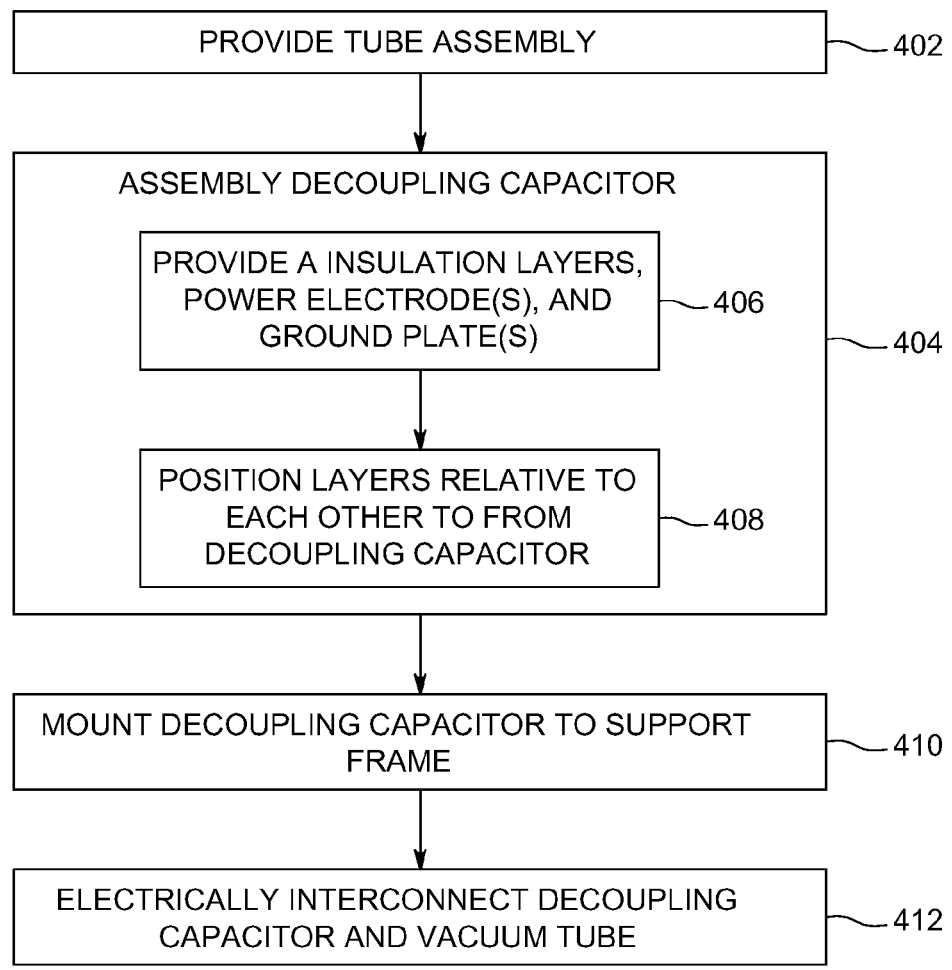
FIG. 11 is a flow chart illustrating a method of assembling a tube amplifier assembly in accordance with an embodiment.

FIG. 11 is a flow chart illustrating a method 400 of assembling a tube amplifier assembly, such as the tube amplifier assembly 170 (FIG. 4). The method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In some embodiments, the method 400 may be part of a maintenance procedure, such as replacing a vacuum tube. In some embodiments, the method 400 may be a method of assembling a decoupling capacitor, such as the decoupling capacitor 200 (FIG. 4).

The method 400 includes providing, at 402, a tube assembly. The tube assembly may include a support frame and a vacuum tube secured to the support frame. The support frame may include a ground wall that is electrically conductive and configured to be coupled to ground. In some embodiments, providing, at 402, includes assembling the tube assembly. For example, the tube assembly may be assembled by securing the vacuum tube, among other things, to a grounding deck and then a shielding structure to the grounding deck. The shielding structure may include the ground wall. Alternatively, the vacuum tube may be secured to the support frame after the support frame is fully assembled.

In some embodiments, the method 400 may include assembling, at 404, a multi-layer decoupling capacitor. For example, assembling, at 404, may include providing, at 406, a first insulation layer, a power electrode, a second insulation layer, and a ground plate. At 408, the different layers are positioned relative to each other in the designated arrangement. For example, the first insulation layer may be positioned adjacent to the power electrode. The second insulation layer may be interleaved between the power electrode and the ground plate. When the decoupling capacitor is mounted to the ground wall, the first insulation layer may be interleaved between the power electrode and the ground wall. Optionally, a conductive epoxy may be used to secure the layers together prior to mounting. As described above, additional insulation layers, power electrodes, and/or ground plates may be added to the stack of layers.

The method may also include mounting, at 410, a decoupling capacitor to the ground wall of the support frame. For example, the ground wall may include holes or openings for receiving fasteners (e.g., bolts, screws). The decoupling capacitor may also include holes that align with the holes of the ground wall. For example, in the tube amplifier assembly 170, a total of six bolts (and accompanying nuts and washers) are used to secure the decoupling capacitor 200. At 412, one or more supply cables may be electrically coupled to the vacuum tube and the decoupling capacitor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A tube amplifier assembly comprising:
a tube assembly comprising a support frame and a vacuum tube secured to the support frame, the support frame including a ground wall that is electrically conductive and configured to be coupled to ground;
a supply cable electrically coupled to the vacuum tube; and
a multi-layer decoupling capacitor having a first insulation layer, a power electrode, a second insulation layer, and a ground plate, wherein the first insulation layer is interleaved between the ground wall and the power electrode and the second insulation layer is interleaved between the power electrode and the ground plate, the supply cable being electrically coupled to the power electrode and the ground plate being mounted to and electrically coupled to the ground wall of the support frame.

2. The tube amplifier assembly of claim 1, wherein the first and second insulation layers are part of a continuous insulative sheet, the insulative sheet being folded around a panel edge of the power electrode.

3. The tube amplifier assembly of claim 1, wherein the power electrode and the ground plate form a capacitive interface, the capacitive interface being planar.

4. The tube amplifier assembly of claim 1, wherein the vacuum tube has a central axis extending through a center of the vacuum tube, the ground wall extending parallel to the central axis.

5. The tube amplifier assembly of claim 1, wherein the power electrode includes a capacitive section that overlaps with the ground wall and a coupling section that clears the ground wall, the supply cable being secured to the coupling section.

6. The tube amplifier assembly of claim 5, wherein the coupling section is folded relative to the capacitive section and extends closer to the vacuum tube.

7. The tube amplifier assembly of claim 1, wherein the ground wall and the ground plate extend substantially parallel to each other and compress the power electrode and the first and second insulation layers therebetween.

8. The tube amplifier assembly of claim 1, wherein the vacuum tube is a power triode.

9. A multi-layer decoupling capacitor comprising:
a power electrode having opposite first and second sides;
first and second insulation layers configured to be positioned along the first and second sides, respectively, of the power electrode; and
a ground plate having opposite first and second sides, the ground plate configured to be positioned along the second insulation layer such that second insulation layer is interleaved between the power electrode and ground plate, wherein the ground plate includes conductive elements that project away from the first side of the ground plate in a mounting direction toward the first insulation layer, the conductive elements configured to electrically couple to a support frame.

10. The decoupling capacitor of claim 9, wherein the ground plate includes an overlapping section that directly overlaps the power electrode and a mounting section that extends beyond the power electrode, the mounting section having an opening for receiving hardware to removably secure the decoupling capacitor to the support frame.

11. The decoupling capacitor of claim 9, wherein the power electrode includes an opening for receiving hardware to removably secure the power electrode to a supply cable.

12. The decoupling capacitor of claim 9, wherein the power electrode includes a capacitive section that extends along the first and second insulation layers and a coupling section that extends beyond the first and second insulation layers and the ground wall, the coupling section having a plurality of openings for receiving hardware to removably secure the coupling panel to cables.

13. The decoupling capacitor of claim 9, wherein the power electrode includes a capacitive section that overlaps with the ground plate and a coupling section that clears the ground plate.

14. The decoupling capacitor of claim 13, wherein the coupling section is folded relative to the capacitive section and extends in the mounting direction.

15. The decoupling capacitor of claim 9, wherein the power electrode is a first power electrode and the ground plate is a first ground plate, the decoupling capacitor further comprising a second power electrode, a second ground plate, and third and fourth insulation layers, the third and fourth insulation layers configured to be positioned along first and second sides, respectively, of the second power electrode, the second ground plate having opposite first and second sides, the second ground plate configured to be positioned along the fourth insulation layer such that fourth insulation layer is interleaved between the second power electrode and second ground plate.

16. The decoupling capacitor of claim 9, wherein the ground plate and the power electrode overlap each other along an overlapping area, the overlapping area being at least 25 cm$^2$.

17. An RF power generator comprising:
a cabinet that defines a system cavity;
a tube amplifier assembly disposed within the system cavity, the tube amplifier assembly comprising a support frame and a vacuum tube secured to the support frame, the support frame including a grounding deck that is electrically conductive and engaged to an interior surface of the generator housing, the tube amplifier assembly also including a supply cable electrically coupled to the vacuum tube; and
a multi-layer decoupling capacitor having a first insulation layer, a power electrode, a second insulation layer, and a ground plate, wherein the first insulation layer is interleaved between the support frame and the power electrode and the second insulation layer is interleaved between the power electrode and the ground plate, the supply cable being electrically coupled to the power electrode and the ground plate being mounted to and electrically coupled to the support frame.

18. The RF power generator of claim 17, wherein the vacuum tube has a central axis extending through a center of the vacuum tube, the decoupling capacitor extending parallel to the central axis.

19. The RF power generator of claim 18, wherein the power electrode forms a platform that extends perpendicular to the central axis and closer to the central axis, the supply cable being secured to the platform, the platform configured to support a weight of the supply cable.

20. The RF power generator of claim 17, wherein the support frame includes a ground wall that faces the interior surface of the generator housing, the ground wall and the interior surface defining a confined space therebetween, the decoupling capacitor being positioned within the confined space.

* * * * *